(12) United States Patent
Tekawade

(10) Patent No.: US 7,732,972 B2
(45) Date of Patent: Jun. 8, 2010

(54) ELECTRICAL MACHINE INCLUDING AXIAL CONNECTOR ASSEMBLIES AND RELATED METHODS

(75) Inventor: Avinash M. Tekawade, Wexford, PA (US)

(73) Assignee: Siemens Energy, Inc., Orlando, FL (US)

( * ) Notice: Subject to any disclaimer, the term of this patent is extended or adjusted under 35 U.S.C. 154(b) by 227 days.

(21) Appl. No.: 12/106,386

(22) Filed: Apr. 21, 2008

(65) Prior Publication Data
US 2009/0261670 A1    Oct. 22, 2009

(51) Int. Cl.
*H02K 3/46* (2006.01)
(52) U.S. Cl. .............................. 310/260; 29/596; 310/52
(58) Field of Classification Search .................. 310/260
See application file for complete search history.

(56) References Cited

U.S. PATENT DOCUMENTS

| 3,614,493 | A | * | 10/1971 | Collings et al. | 310/54 |
| 3,675,058 | A | * | 7/1972 | Beddows et al. | 310/71 |
| 4,199,700 | A | * | 4/1980 | Daugherty et al. | 310/71 |
| 4,380,362 | A | * | 4/1983 | Swensrud et al. | 439/487 |
| 4,621,850 | A | | 11/1986 | Wiersema et al. | 294/81.61 |
| 4,806,807 | A | | 2/1989 | Levino | 310/71 |
| 4,894,575 | A | | 1/1990 | Nilsson et al. | 310/260 |
| 5,039,896 | A | | 8/1991 | Adams et al. | 310/71 |
| 5,573,414 | A | * | 11/1996 | Taillon et al. | 439/191 |
| 6,538,339 | B2 | | 3/2003 | Krizek et al. | 290/1 |
| 7,088,020 | B2 | | 8/2006 | Holly, III et al. | 310/52 |
| 7,321,179 | B2 | * | 1/2008 | Ward et al. | 310/260 |
| 7,400,072 | B2 | * | 7/2008 | Ward | 310/71 |

FOREIGN PATENT DOCUMENTS

WO    2006/063186    6/2006

* cited by examiner

*Primary Examiner*—Burton Mullins

(57) ABSTRACT

An electrical machine may include a plurality of stator coil ends each having a fluid passageway therein. The electrical machine may further include a plurality of rings and a plurality of axial connector assemblies for connecting the plurality of stator coil ends to the plurality of rings. Each axial connector assembly may include a header cap including an open end received on a respective stator coil end and a closed end opposite the open end, the closed end defining a coil spherical connector portion. The header cap may have a fluid port therein coupled to the fluid passageway of the respective stator coil end. A ring spherical connector portion may be carried by a respective ring, and a pair of connector members may receive therebetween the coil and ring spherical connector potions.

20 Claims, 4 Drawing Sheets

ELECTRICAL MACHINE INCLUDING AXIAL CONNECTOR ASSEMBLIES AND RELATED METHODS

FIELD OF THE INVENTION

The present invention relates to electrical machines, and more particularly, to stator coil connectors for electrical machines, such as electrical generators, and associated methods.

BACKGROUND OF THE INVENTION

An example of relatively large electrical machinery is an electrical generator driven by a turbine in a power generating plant. The electrical generator generally includes a rotor, and a stator surrounding the rotor. Stator windings or coils extend outwardly to the ends of the stator. The stator coil ends are connected to parallel phase rings at the end of the stator.

The size and configuration of an electrical generator generally requires that, to facilitate the installing or replacing of stator coils of the generator, the stator coils be arranged in physically separate coil sections, or halves. After they are set in their appropriate location, the stator coils need to be electrically and mechanically connected to one another at their ends. Similar connections may also be used between the ends of each phase coil. Maintaining consistently reliable series and phase connections between such coil ends is an important consideration both from a mechanical and an electrical standpoint.

It is known to use brazing techniques to affix connectors, such as made up of solid copper bars, to each coil end. This can provide effective series and phase connections between the coil ends. However, such techniques may be time-consuming and could take several days for performing a service rewind operation, even for experienced and skilled service personnel.

U.S. Pat. No. 4,894,575 to Nilsson et al. discloses an electrical generator connection to connect coil ends in series. A header cap having a spherically shaped end portion is brazed to each coil end to be connected. The spherically shaped end portion includes a top coil water hose nipple in the center thereof to allow fluid for cooling to pass therein. A pair of connector bars, each having similarly sized spherical seats, receives the spherically shaped portion of each coil end header cap. Electrical and mechanical connections are provided by bolting two connector bars together.

Similarly, PCT Publication No. WO2006/063186 discloses a bolted spherical series and phase connector for stator coils. A header cap having a spherically shaped end portion with a fluid port centrally located therein is brazed or connected to each stator coil to be connected. A pair of connector bars, each having similarly sized spherical seats, receives the spherically shaped portion of each coil end header cap. Electrical and mechanical connections are provided by bolting two connector bars together.

Still, the above connecting techniques may not be timesaving, especially when connecting a stator coil to a parallel ring in performing a service rewind operation. This time can be further extended for performing a rewind operation on a non-OEM generator, where an existing parallel ring is not positioned serially, or in a top-bottom configuration. In this case, the techniques already known do not apply, as they apply to a radial connection for stator coils. Thus, there is a need to reduce the time for performing such operations.

SUMMARY OF THE INVENTION

In view of the foregoing background, it is therefore an object of the present invention to provide an electrical machine including an axial connector assembly for connecting stator coil ends to rings, and related methods.

This and other objects, features, and advantages in accordance with the present invention are provided by an electrical machine. An electrical machine may include a plurality of stator coil ends each having a fluid passageway therein and a plurality of rings. The electrical machine may further include a plurality of axial connector assemblies for connecting the plurality of stator coil ends to the plurality of rings. Each axial connector assembly may include a header cap including an open end received on a respective stator coil end and a closed end opposite the open end. The closed end may define a coil spherical connector portion, and the header cap may have a fluid port therein coupled to the fluid passageway of the respective stator coil end. A ring spherical connector portion may be carried by a respective ring, and a pair of connector members may be received therebetween the coil and ring spherical connector potions. Accordingly, the electrical machine may provide a more readily installed axial connector assembly for connecting stator coil ends to rings.

In some embodiments, the coil and ring spherical connector potions may be aligned along an axis of the respective stator coil end. In other embodiments, the ring spherical connector portion may be aligned along an axis of the respective stator coil end, and the coil spherical connector portion may offset from the axis.

The header cap further may include an intermediate portion between the open end and the closed end. The header cap may also further include a fluid nipple extending outwardly from the intermediate portion and defining the fluid port.

Each of the connector members may have a pair of half-spherical recesses therein. In addition, the pair of connector members may have a plurality of aligned fastener receiving passageways therein, and respective fasteners may be positioned in the aligned fastener receiving passageways. Each axial connector assembly may comprise copper, for example.

A method aspect of the invention is directed to axially connecting a stator coil end to a ring of an electrical machine. Each stator coil end may have a fluid passageway therein. The method may comprise installing a header cap comprising an open end onto the stator coil end, and a closed end opposite the open end. The closed end may define a coil spherical connector portion, and the header cap may have a fluid port therein coupled to the fluid passageway of the stator coil end. The method may also include installing a ring spherical connector portion onto the ring, and joining a pair of connector members together and receiving therebetween the coil and ring spherical connector potions.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
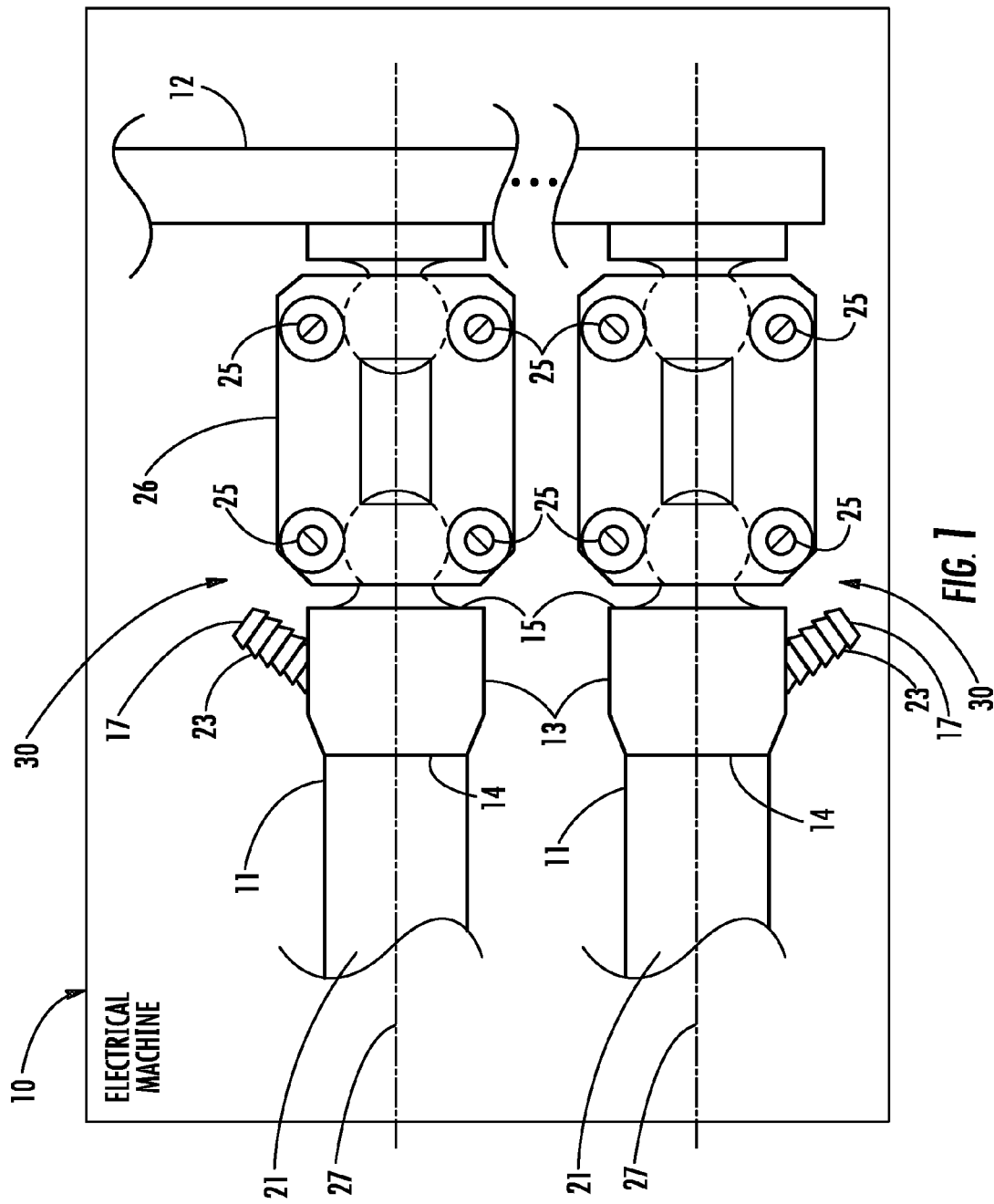
FIG. 1 is a schematic view of an electric machine in accordance with the present invention.
Figure 2:
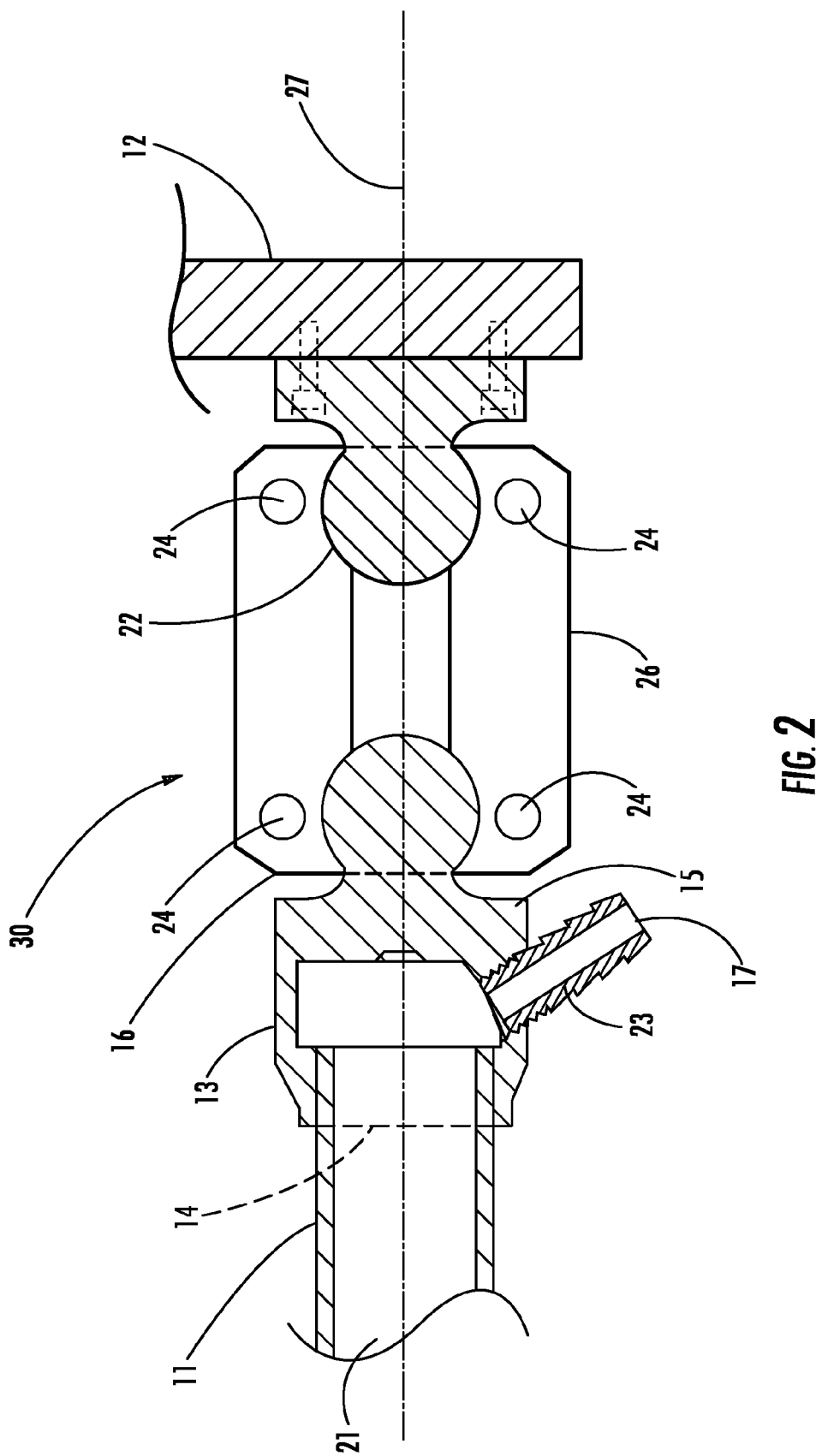
FIG. 2 is a cross-sectional view of the embodiment of an axial connector assembly as shown in FIG. 1.

Referring initially to FIGS. 1 and 2, an electrical machine 10 includes a plurality of stator coil ends 11 each having a fluid passageway 21 therein, and a plurality of rings 12. The stator coil ends 11 and the plurality of the rings 12 may, as is well known to those having ordinary skill in the art, be part of a large electrical generator for a power plant, for example. The electrical machine 10 illustratively includes a plurality of axial connector assemblies 30 for axially connecting the plurality of stator coil ends 11 to the plurality of rings 12.

The axial connector assembly 30 is particularly advantageous to an installer performing a coil rewind, for example. One potential issue with performing a coil rewind, especially in a non-OEM generator, is the interface connection between the stator coil ends 11 and the rings 12. As will be appreciated by those skilled in the art, the axial connector assembly 30 has time-saving benefits over traditional series connections and may reduce interfacing issues, as it advantageously provides an installer with a compact design and ease of installation in a space-limited environment.

Each axial connector assembly 30 illustratively includes a header cap 13 including an open end 14 received on a respective stator coil end 11. The open end 14 is received on the respective stator coil end 11 by welding and/or brazing techniques, as are known to those skilled in the art. A closed end 15 opposite the open end 14 illustratively defines a coil spherical connector portion 16.

The header cap 13 illustratively has a fluid port 17 therein coupled to the fluid passageway 21 of the respective stator coil end 11. The header cap 13 further comprises an intermediate portion between the open end and the closed end 14, 15. A fluid nipple 23 extends outwardly from the intermediate portion and defines the fluid port 17.

Fluid within the fluid passageway 21 provides cooling of the electrical machine. The fluid may be water, for example, or other cooling liquid known to those skilled in the art. The fluid port 17, as defined by the fluid nipple 23, advantageously allows the cooling fluid to be redirected. A hose or other conduit, for example, may be coupled to the fluid nipple 23 to redirect the cooling fluid, as will be particularly advantageous in interfacing the stator coils with the rings. The fluid nipple 23 also allows an installer increased accessibility and ease of installation over a conventional prior art header cap which includes an open end connector spherical portion forming the fluid port therein.

A ring spherical connector portion 22 is similarly carried by a respective ring 12. A pair of connector members 26 receive therebetween the coil end and ring spherical connector potions 16, 22. The connector members 26 each have a pair of half-spherical recesses therein to accept the coil end and ring spherical portions 16, 22. A detent may be used to aid in aligning and placing the coil end and ring spherical portions 16, 22 in their respective half-spherical recesses.

The coil and ring spherical connector portions 16, 22 advantageously allow an installer to rotate or position the pair of connector members 26 for ease of installation, prior to fastening. The connector members 26 include a plurality of aligned fastener receiving passageways 24 for receiving respective fasteners 25. The fastener receiving passageways 24 are preferably positioned adjacent respective half-spherical recesses for adequate fastening of the connector members 26 to the coil and ring spherical connector portions 16, 22. Fasteners 25 may include a nut and bolt arrangement, for example.

The axial connector assembly 30 and the pair of connector members 26 may comprise copper, for example. However, other conductive materials may be used, as will be appreciated by those having ordinary skill in the art.

The coil and ring spherical connector potions 16, 22 are aligned along an axis 27 of the respective stator coil end 11. The connector members 26 illustratively are a rectangular plate shape to accommodate a common alignment of the coil and ring spherical connector portions 16, 22. However, other shapes may be used. The connector members 26 also illustratively include an opening defined therein. The opening provides visual confirmation of the placement of the coil and ring spherical connector portions 16, 22 within the connector members 26 and advantageously reduces the overall material used, thus reducing the overall cost of manufacture.

Figure 3:
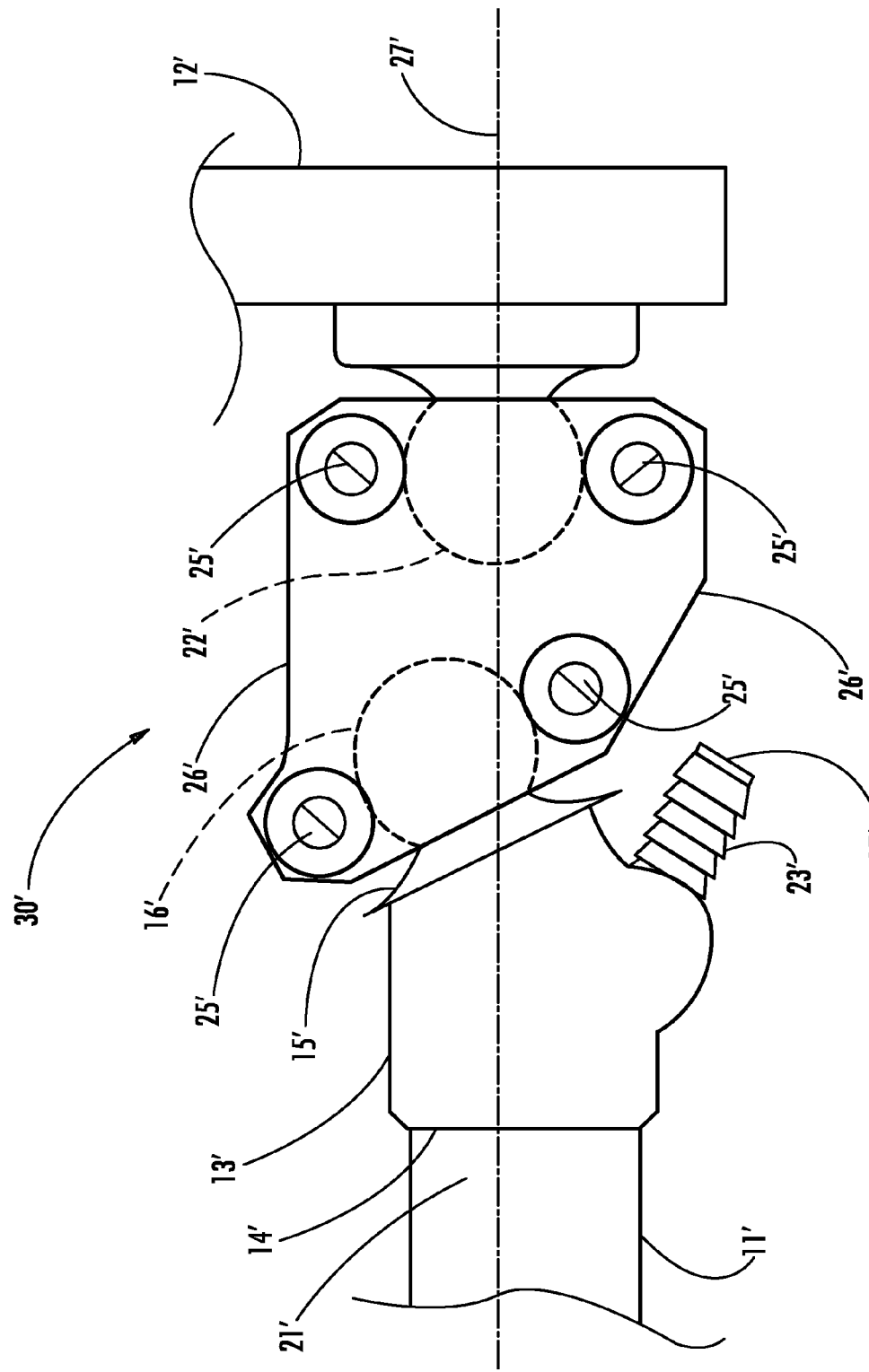
FIG. 3 is a schematic view of another embodiment of an axial connector assembly in accordance with the present invention.
Figure 4:
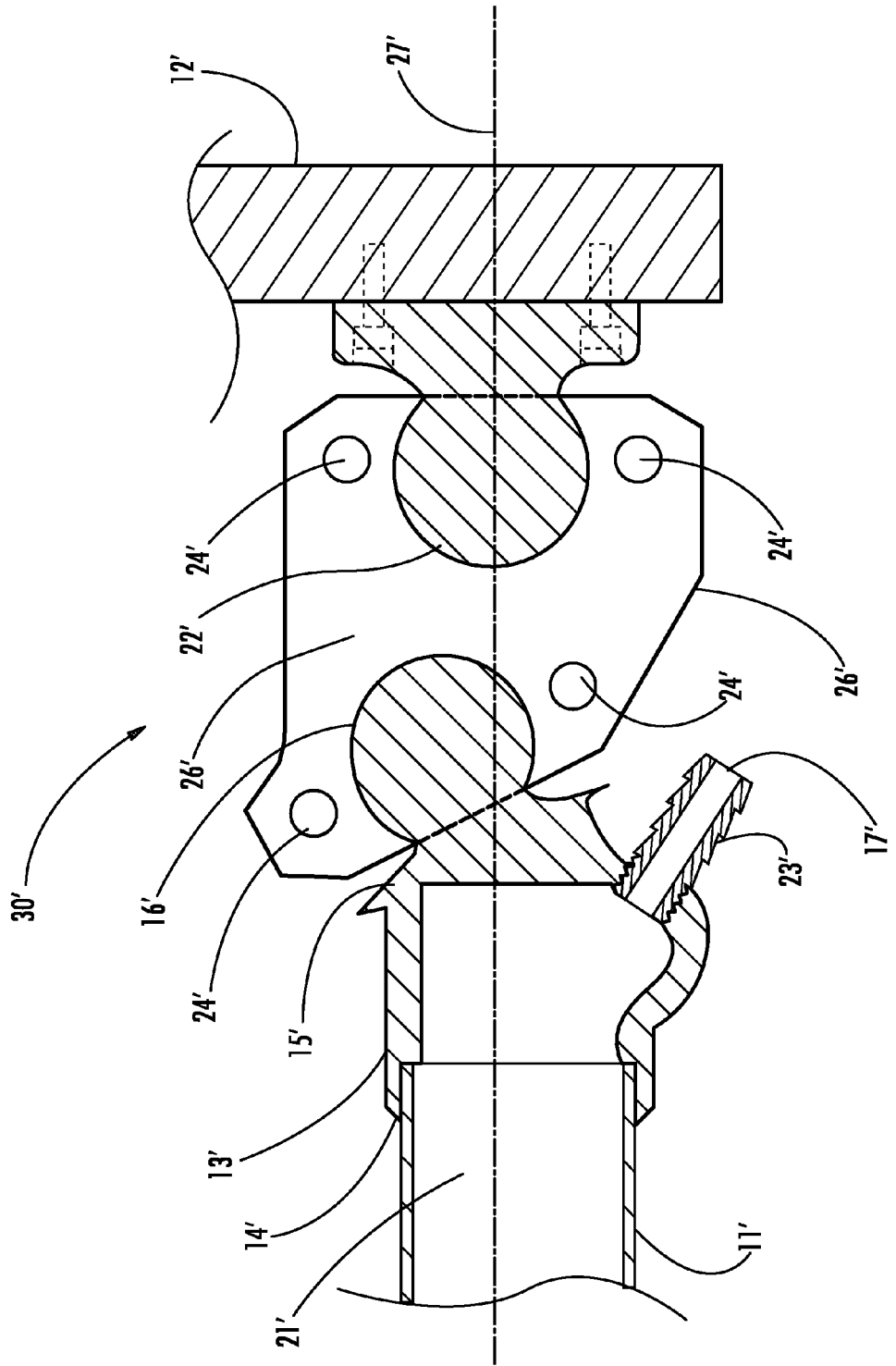
FIG. 4 is a cross-sectional view of the axial connector assembly of FIG. 3.

Turning now to FIGS. 3 and 4, another embodiment of the connector assembly 30' is illustrated. The header cap 13' illustratively includes an open end 14' received on a respective stator coil end 111'. A closed end 15' opposite the open end 14' defines a coil spherical connector portion 16'. The stator coil end 11' has an axis 27' associated therewith, and a respective ring spherical connector portion 22', similar to the spherical ring connector portion 22 from above, is aligned along this axis 27'. The coil spherical connector portion 16' is offset from the axis 27' in the illustrated embodiment. This advantageously may allow an installer more room to braze or weld the header cap 13' onto the stator coil end 11', as will be appreciated by those skilled in the art. Additionally, the offset may make the overall design more compact, thus allowing use in smaller and tighter spaces while maintaining ease. of installation, as is particularly helpful in interfacing the stator coil end 11' with the ring 12' in coil rewind between a non-OEM generator, for example.

Additionally, the fluid port 17' and the fluid nipple 23' extending outwardly therefrom the intermediate portion, are positioned at a smaller offset from the axis 27', as compared to the coil spherical connector portion 16. The smaller offset advantageously reduces the resistance of fluid flow through the fluid port 17', and thus, increases water flow through the fluid port. The orientation of the fluid port 17' advantageously allows an installer to easily couple a hose, or other fluid conduit thereto.

The connector members 26' are shaped to reflect the compact design and to accommodate the offset alignment between the coil and ring spherical connector portions 16', 22'. Other shapes, as will be appreciated by those skilled in the art, may be used to accommodate different offsets between the coil and ring spherical connector portions 16', 22'.

Referring again to FIGS. 1 and 2, a method aspect is for axially connecting a stator coil end 11 to a ring 12 of an electrical machine 10, each stator coil end having a fluid passageway 21 therein. The method includes installing a header cap 30 comprising an open end 14 onto the stator coil end 11 and a closed end 15 opposite the open end. The closed end defines a coil spherical connector portion 16, and the header cap 30 has a fluid port 17 therein coupled to the fluid passageway 21 of the stator coil end. A ring spherical connector portion 22 is installed onto the ring 12. The method further includes joining a pair of connector members 26 together and receiving therebetween the coil and ring spherical connector potions 16, 22.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An electrical machine comprising:
   a plurality of stator coil ends each having a fluid passageway therein;
   a plurality of rings; and
   a plurality of axial connector assemblies for connecting the plurality of stator coil ends to said plurality of rings, each axial connector assembly comprising
      a header cap comprising an open end received on a respective stator coil end and a closed end opposite the open end, the closed end defining a coil spherical connector portion, and said header cap having a fluid port therein coupled to the fluid passageway of the respective stator coil end,
      a ring spherical connector portion carried by a respective ring,
      a pair of connector members receiving therebetween said coil and ring spherical connector potions.

2. The electrical machine according to claim 1 wherein said coil and ring spherical connector potions are aligned along an axis of the respective stator coil end.

3. The electrical machine according to claim 1 wherein said ring spherical connector portion is aligned along an axis of the respective stator coil end; and wherein said coil spherical connector portion is offset from the axis.

4. The electrical machine according to claim 1 wherein said header cap further comprises an intermediate portion between the open end and the closed end; and further comprising a fluid nipple extending outwardly from said intermediate portion and defining the fluid port.

5. The electrical machine according to claim 1 wherein each of said connector members has a pair of half-spherical recesses therein.

6. The electrical machine according to claim 1 wherein said pair of connector members has a plurality of aligned fastener receiving passageways therein.

7. The electrical machine according to claim 6 further comprising respective fasteners in the aligned fastener receiving passageways.

8. The electrical machine according to claim 1 wherein each axial connector assembly comprises copper.

9. An axial connector assembly for connecting a stator coil end to a ring of an electrical machine, each stator coil end having a fluid passageway therein, the axial connector assembly comprising:
   a header cap comprising an open end to be received on the stator coil end and a closed end opposite the open end, the closed end defining a coil spherical connector portion, and said header cap having a fluid port therein to be coupled to the fluid passageway of the stator coil end;
   a ring spherical connector portion to be carried by the ring; and
   a pair of connector members to receive therebetween said coil and ring spherical connector potions.

10. The axial connector assembly according to claim 9 wherein said coil and ring spherical connector potions are to be aligned along an axis of the stator coil end.

11. The axial connector assembly according to claim 9 wherein said ring spherical connector portion is to be aligned along an axis of the stator coil end; and wherein said coil spherical connector portion is offset from the axis.

12. The axial connector assembly according to claim 9 wherein said header cap further comprises an intermediate portion between the open end and the closed end; and further comprising a fluid nipple extending outwardly from said intermediate portion and defining the fluid port.

13. The axial connector assembly according to claim 9 wherein each of said connector members has a pair of half-spherical recesses therein.

14. The axial connector assembly according to claim 9 wherein said pair of connector members has a plurality of aligned fastener receiving passageways therein; and further comprising respective fasteners in the aligned fastener receiving passageways.

15. A method for axially connecting a stator coil end to a ring of an electrical machine, each stator coil end having a fluid passageway therein, the method comprising:
   installing a header cap comprising an open end onto the stator coil end and a closed end opposite the open end, the closed end defining a coil spherical connector portion, and the header cap having a fluid port therein coupled to the fluid passageway of the stator coil end;
   installing a ring spherical connector portion onto the ring; and
   joining a pair of connector members together and receiving therebetween the coil and ring spherical connector potions.

16. The method according to claim 15 wherein the coil and ring spherical connector potions are aligned along an axis of the stator coil end.

17. The method according to claim 15 wherein the ring spherical connector portion is aligned along an axis of the stator coil end; and wherein the coil spherical connector portion is offset from the axis.

18. The method according to claim 15 wherein the header cap further comprises an intermediate portion between the open end and the closed end; and further comprising a fluid nipple extending outwardly from the intermediate portion and defining the fluid port; and wherein the method further comprises coupling the fluid nipple to a fluid source.

19. The method according to claim 15 wherein each of the connector members has a pair of half-spherical recesses therein.

20. The method according to claim 15 wherein the pair of connector members has a plurality of aligned fastener receiving passageways therein; and wherein joining the pair of connector members together comprises securing respective fasteners in the aligned fastener receiving passageways.

* * * * *